J. FLINNER.
FARM GATE.
APPLICATION FILED OCT. 8, 1910.
1,134,601.
Patented Apr. 6, 1915.
2 SHEETS—SHEET 1.
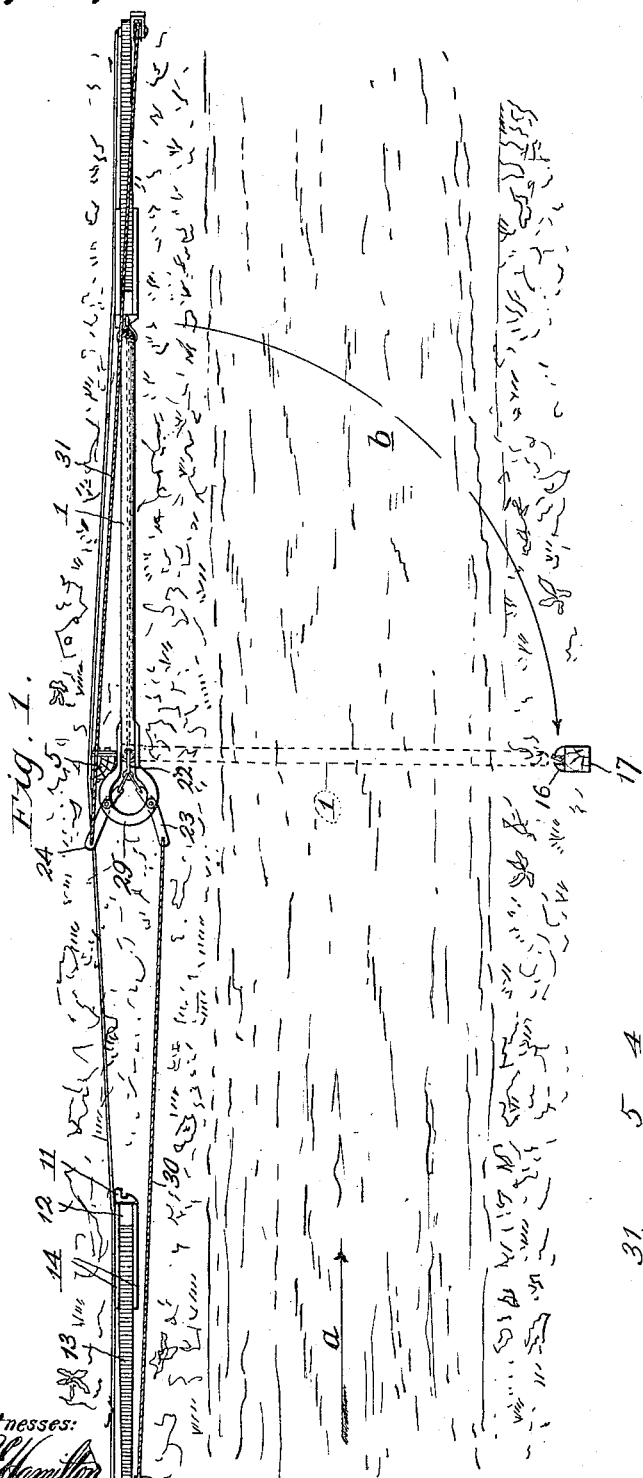
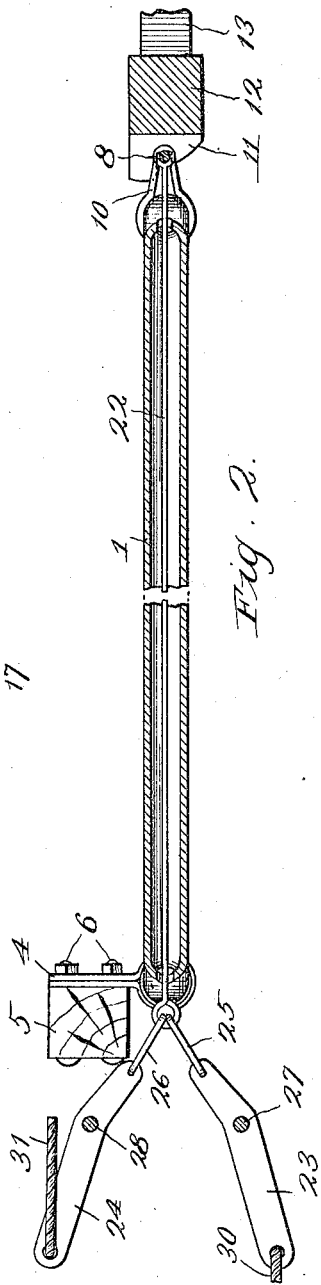
Inventor,
John Flinner,
By F. G. Fischer,
Atty.

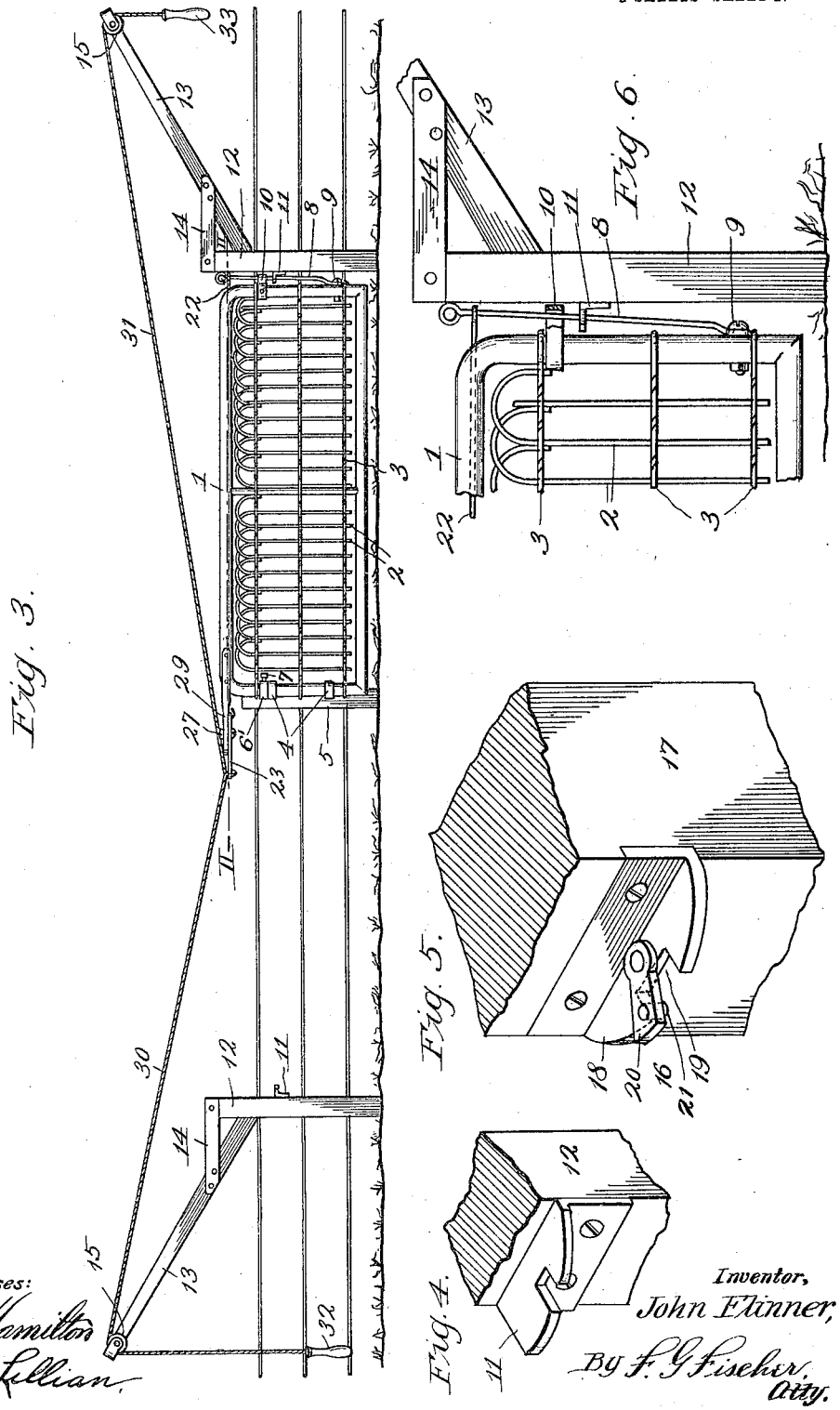

UNITED STATES PATENT OFFICE.

JOHN FLINNER, OF LEAVENWORTH, KANSAS.

FARM-GATE.

1,134,601. Specification of Letters Patent. Patented Apr. 6, 1915.

Application filed October 8, 1910. Serial No. 586,075.

*To all whom it may concern:*

Be it known that I, JOHN FLINNER, a citizen of the United States, residing at Leavenworth, in the county of Leavenworth and State of Kansas, have invented certain new and useful Improvements in Farm Gates, of which the following is a specification.

My invention relates to farm gates, and one of my objects is to produce a simple, inexpensive gate of this character which may be opened by a person in a vehicle or on horseback, without dismounting.

Other objects of the invention will hereinafter appear and in order that said invention may be fully understood, reference will be had to the accompanying drawings in which:

Figure 1 is a plan view of my improved gate in open position, it being shown closed in dotted lines. Fig. 2 is a horizontal section of the gate on line II—II of Fig. 3. Fig. 3 is a side elevation of the gate in open position. Figs. 4 and 5 are details of keepers employed in holding the gate in open and closed positions, respectively. Fig. 6 is a broken front elevation of the front portion of the gate showing latch thereon for securing the gate in open and closed positions.

In carrying out my invention I employ a gate consisting of a rectangular tubular frame 1, wire pickets 2, and longitudinal wires 3, whereby pickets 2 are secured to frame 1. The rear end of the gate pivotally engages a pair of hinges 4, secured to an intermediate post 5, by bolts 6. The gate is slidably mounted in the hinges 4 so that it may be raised one or more feet to clear snow or other obstacles on the road, it being supported in any of its adjusted positions by a collar 6' resting upon the uppermost hinge and secured to the gate by a set screw 7.

The front end of the gate is provided with a spring-latch 8, secured to the lower portion thereof by a bolt 9, extending upward through a loop 10, also secured to the front end of the gate. Latch 8 coöperates with a pair of keepers 11 in holding the gate in its open positions, said keepers being secured to posts 12, arranged at opposite sides of the intermediate post 5 and provided with inclined arms 13, firmly secured to said posts by braces 14 and provided at their upper ends with hooded-sheaves 15. When the gate opens to the right the latch 8 engages one of said keepers 11, and when the gate opens to the left, said latch engages the other keeper 11. Latch 8 coöperates with a keeper 16, secured to a post 17 at the side of the road, immediately opposite post 5, to hold the gate in closed position. Keeper 16 comprises a bracket 18 having a central notch 19 and a pivoted tongue 20 to guide latch 8 into said notch 19, the pivotal movement of tongue 20 being limited by a depending pin 21 contacting with either side of notch 19. Latch 8 is drawn to an inoperative position and the gate is swung to an open or closed position by a rod 22, extending through the upper tubular portion of the gate and connected at its forward end to latch 8 and at its rear end to levers 23 and 24 through the intermediacy of links 25 and 26, respectively. Levers 23 and 24 are fulcrumed upon bolts 27 and 28, extending through a horizontal yoke 29 secured to the upper rear portion of the gate. Levers 23 and 24 are controlled by cables 30 and 31, extending in opposite directions and running over sheaves 15, from which they depend, and are provided, respectively, with handles 32 and 33, arranged within convenient reach and of sufficient weight to keep the cables taut.

Assuming that the gate is in the closed position indicated by dotted lines, Fig. 1, a person passing in the direction of arrow *a* grasps handle 32 and pulls downward thereon to disengage latch 8 from keeper 16 and swing the gate in the open position shown by full lines, where it is secured by latch 8 engaging the keeper 11. When the person reaches handle 33, the latch is disengaged from the keeper 11 and the gate swung in the direction of arrow *b* to closed position by pulling downward on said handle. When the gate almost reaches post 17, handle 33 is released to allow latch 8 to engage tongue 20 and be guided thereby into notch 19 of keeper 16. A person passing in a direction opposite to arrow *a* opens the gate by pulling downward on handle 33, which operation causes the gate to swing in the same direction as arrow *b*, it being understood that the gate is always swung in the same direction in which the person is passing, which arrangement permits handles 32 and 33 to be placed closer to each other as space ordinarily occupied by a team does not have to be included between said handles and the gate. By employing a keeper with the pivoted tongue 20 there is no danger of the gate swinging too far when being closed, as said tongue projects into the path of latch 8 and guides the same into the notch 19 of the keeper.

While I have shown the preferred construction of my invention, I of course, do not limit myself to the exact arrangement and construction shown in the drawings, but reserve the right to make such changes as properly fall within the spirit and scope of the appended claim.

Having thus described my invention, what I claim, and desire to secure by Letters Patent is:

A gate comprising a tubular frame, a rod slidably mounted in the upper bar of the frame, a yoke comprising a horizontally disposed loop, the ends of which terminate in spaced arms for attachment to the opposite sides of the rear end of the upper bar, the inner end of said rod extending into the loop, levers pivotally connected, intermediate their ends to the loop and in oblique relation to the upper bar, links pivotally connecting the inner ends to the levers and inner end of the rod, said levers having their inner ends disposed in obtuse angular relation to their outer ends, whereby said inner ends are operable in the confines of the loop and in close parallel relation to the bar.

In testimony whereof I affix my signature, in the presence of two witnesses.

JOHN FLINNER.

Witnesses:
F. G. FISCHER,
E. C. LILLIAN.

Copies of this patent may be obtained for five cents each, by addressing the "Commissioner of Patents, Washington, D. C."